(12) United States Patent
Sieth et al.

(10) Patent No.: US 7,655,139 B2
(45) Date of Patent: Feb. 2, 2010

(54) METHOD AND SYSTEM FOR OPERATING A SHUT-OFF VALVE OF A FILTRATION SYSTEM

(75) Inventors: Kenneth J. Sieth, Delafield, WI (US); Richard M. Reckin, Colgate, WI (US); Duane S. Freimuth, Franklin, WI (US)

(73) Assignee: General Electric Company, Schenectady, NY (US)

( * ) Notice: Subject to any disclaimer, the term of this patent is extended or adjusted under 35 U.S.C. 154(b) by 736 days.

(21) Appl. No.: 11/212,476

(22) Filed: Aug. 26, 2005

(65) Prior Publication Data

US 2007/0045186 A1 Mar. 1, 2007

(51) Int. Cl.
*B01D 61/06* (2006.01)
*B01D 61/10* (2006.01)
*B01D 61/12* (2006.01)

(52) U.S. Cl. .............. 210/110; 210/257.2; 210/321.66
(58) Field of Classification Search .............. 210/257.2, 210/110, 321.66, 257.1
See application file for complete search history.

(56) References Cited

U.S. PATENT DOCUMENTS

| | | | |
|---|---|---|---|
| 4,021,343 A | 5/1977 | Tyler | |
| 4,190,537 A * | 2/1980 | Tondreau et al. | 210/98 |
| 5,002,664 A | 3/1991 | Clack et al. | |
| 5,128,035 A | 7/1992 | Clack et al. | |
| 5,468,387 A | 11/1995 | Solomon | |
| RE35,252 E | 5/1996 | Clack et al. | |
| 6,007,710 A | 12/1999 | Pavel | |
| 6,063,275 A | 5/2000 | Traylor | |
| 6,436,282 B1 | 8/2002 | Gundrum et al. | |
| 6,843,912 B2 | 1/2005 | Chaney et al. | |
| 7,303,666 B1 * | 12/2007 | Mitsis | 210/106 |
| 7,402,240 B2 * | 7/2008 | Kung et al. | 210/110 |
| 2003/0178355 A1 * | 9/2003 | Beach | 210/232 |

FOREIGN PATENT DOCUMENTS

GB 2083555 A 3/1982

OTHER PUBLICATIONS

"European Application Serial No. 06254375.6, European Search Report mailed Aug. 22, 2008", 9 pgs.

* cited by examiner

*Primary Examiner*—Terry K Cecil
(74) *Attorney, Agent, or Firm*—Schwegman Lundberg & Woessner, P.A.

(57) ABSTRACT

A filtration assembly includes a feed water line and a permeate line. A shut-off valve is coupled between the permeate line and the feed water line and operative to open the feed line when the faucet is opened based on a pressure differential between the feed line and the permeate line. An energy storage member is located within the permeate line and configured to compress and then expand after the faucet is closed causing the shut-off valve to fully close.

11 Claims, 5 Drawing Sheets

METHOD AND SYSTEM FOR OPERATING A SHUT-OFF VALVE OF A FILTRATION SYSTEM

FIELD

The present invention relates to the field of water filtration systems and more specifically to a system to operate a shut-off valve of a filtration system.

BACKGROUND

Water filtration systems are used to purify water. For example, a reverse osmosis (RO) system includes an RO membrane. When feed water enters the system, some water goes through the membrane as purified permeate and some is left as concentrate. A shut-off valve can be used to control water flow through the system. For example, the shut-off valve can be placed between the feed line and the permeate line. When the pressure drops in the permeate line, the shut-off valve opens the feed line and water flows though the system. When the pressure rises in the permeate line, the shut-off valve closes and water stops flowing. However, sometimes the shut-off valve does not close all the way and feed water may continue to run to drain.

SUMMARY

A filtration assembly includes a feed water line and a permeate line. A shut-off valve is coupled between the permeate line and the feed water line and operative to open the feed line when the faucet is opened based on a pressure differential between the feed line and the permeate line. An energy storage member is located within the permeate line and configured to compress and then expand after the faucet is closed.

DETAILED DESCRIPTION

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the scope of the present invention. Therefore, the following detailed description is not to be taken in a limiting sense, and the scope of the present invention is defined by the appended claims and their equivalents.

Figure 1:
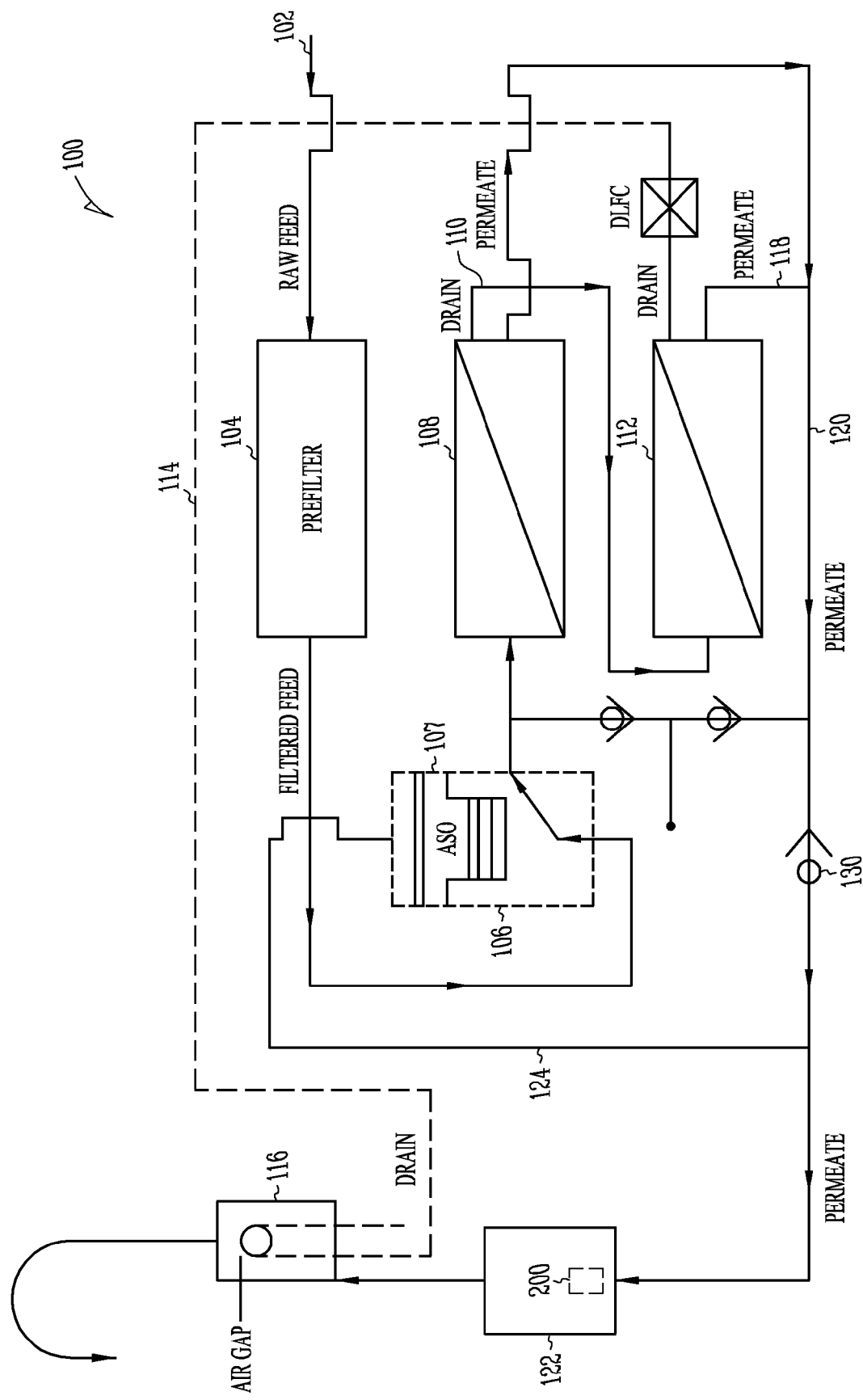
FIG. 1 shows a schematic representation of a water filtration system, in accordance with one embodiment, having a faucet open.
Figure 2:
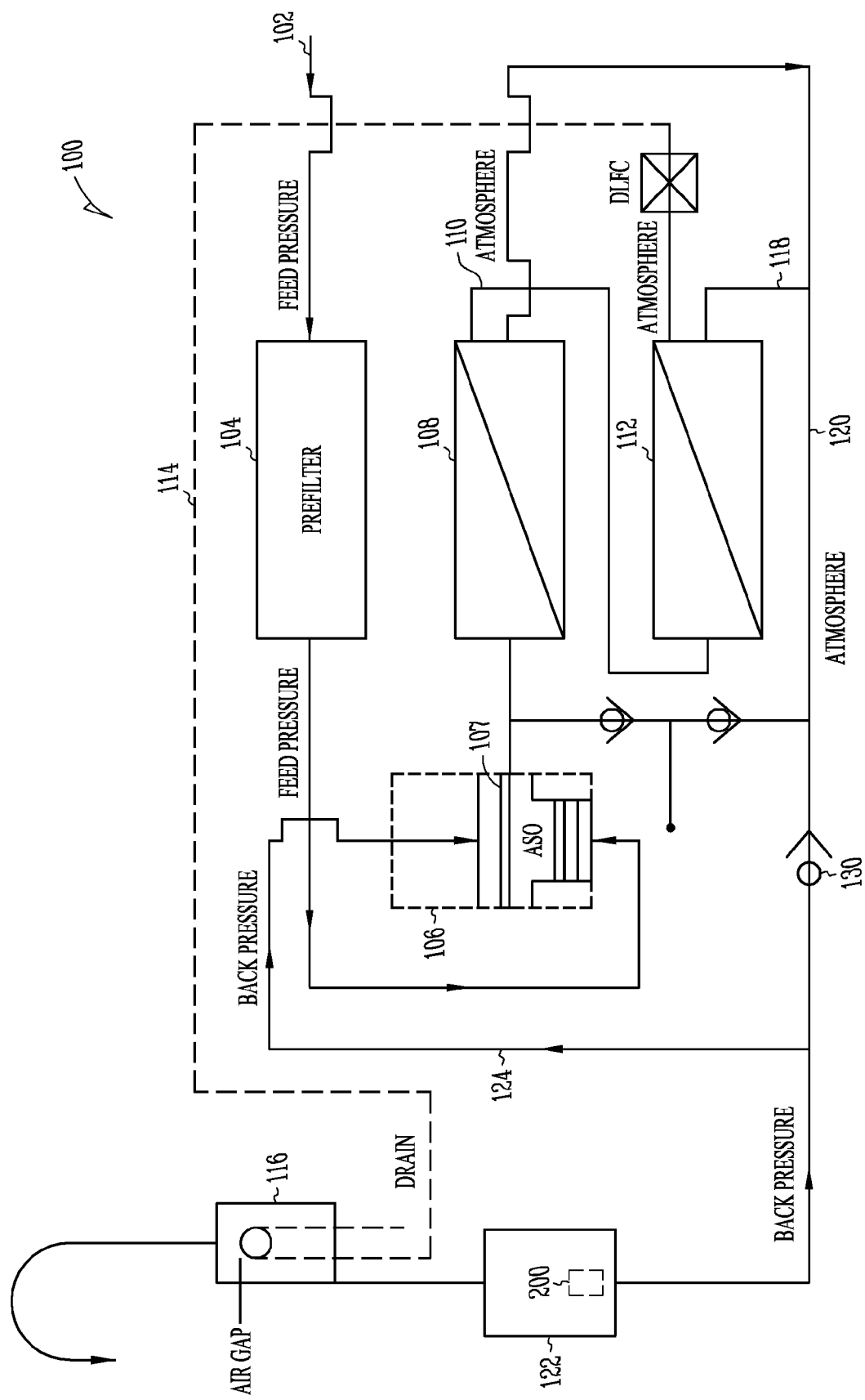
FIG. 2 shows a schematic representation of the water filtration system of FIG. 1, when the faucet is closed.

FIG. 1 shows a schematic representation of a water filtration system 100, in accordance with one embodiment. In FIG. 1, a faucet 116 is open. FIG. 2 shows water filtration system 100 when faucet 1 16 is closed.

Water filtration system 100 is a filtration assembly generally including a feed water input line 102, a pre-filter 104, a shut-off valve 106, one or more filtration elements 108, 112, a permeate line 120, a concentrate line 114, and a container 122, such as a post-filter. Container 122 can include post-filter elements, such as a carbon filter. Some embodiments omit the post-filter elements from container 122. Permeate outlet line 120 is coupled to faucet 116, which is actuated to allow water to flow through the system.

In this example, filtration elements 108, 112 can include two RO elements connected in series via line 110 for system 100. In other embodiments, a single element can be used or filtration elements 108, 112 can be configured in parallel. Lines 102, 110, 114, and 120 can be hoses, molded passages, pipes, other fluid communication passages, or combinations of any of these. Pre-filter 104 can be a carbon filter and/or a sediment filter to treat the feed water before the water reaches the filtration elements 108, 112. As noted, container 122 can include a carbon filter. In one embodiment, system 100 can include a housing enclosing and housing the elements.

In some embodiments, a high-flux membrane can be used for the RO elements 108, 112 of system 100. A system having a high-flux membrane eliminates the need for a permeate storage tank between elements 108, 112 and the faucet 116. In general, system 100 is configured as a tank-less RO system for home use. In such an environment, feed-line 102 operates under a feed pressure of about 40-80 psi. The entire system is usually fitted beneath a sink or can be enclosed in a housing and located on a counter next to the sink, for example. Other embodiments can utilize a tank if desired.

Shut-off valve 106 is operatively coupled between line 120 and feed water line 102. For example, permeate line 120 can include a branch line 124 to communicate permeate line pressure to the shut-off valve 106. A check valve 130 is located in line 120. Shut-off valve 106 is operative so as to use the pressure differential between permeate line 120 and feed line 114 to regulate flow through the system. Thus, when a user opens faucet 116 the corresponding drop in pressure in line 120 causes shut-off valve 106 to open feed line 102 letting water flow through the shut-off valve and through the elements 108, 112 (FIG. 1). When the faucet 116 is closed (FIG. 2), the relatively higher pressure in line 120 causes shut-off valve 106 to close, and water stops flowing. The shut-off valve 106 includes a piston 107 that is biased towards a closed state and closes at about ⅓ to ¼ of the feed pressure. Thus, for example, if feed water pressure is about 60 psi, then when the permeate pressure in line 120 rises above about 20 psi, the piston 107 moves towards a closed state.

System 100 further includes an energy storage member 200 located within the permeate line 120. In one example, energy storage member 200 is configured to provide an air cushion that helps piston 107 of the shut-off valve 106 complete its movement and fully close the shut-off valve when the faucet is closed. This is needed because the permeate pressure is dependent on flow through the shut-off valve. When the faucet is first closed the pressure in the permeate line is at its highest and the shut-off valve begins to close. However, as the shut-off valve closes the permeate pressure drops and less permeate enters line 120. The permeate pressure's dependency on the feed water flow may not allow the piston 107 to achieve full travel. Therefore, the feed water never fully shuts off and the system continues to run with feed water going to drain.

In contrast, in system 100, when faucet 116 closes, the relatively high permeate pressure squeezes and compresses the energy storage member 200. As the valve 106 closes, the permeate pressure drops until the energy storage member 200 expands to provide pressure to the piston 107 of shut-off valve 106. This expansion then causes the piston 107 to fully close.

In this example, energy storage member 200 is located within container 122. In other embodiments, energy storage member 200 can be located anywhere in the permeate line 120 or branch line 124 between check valve 130 and faucet 116.

Figure 3:
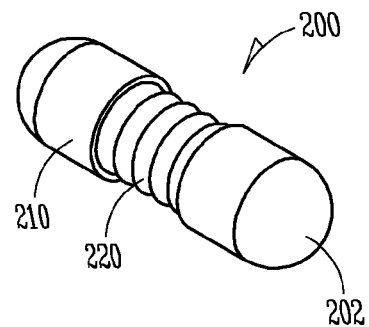
FIG. 3 shows a perspective view of an energy storage member according to one embodiment.
Figure 4:
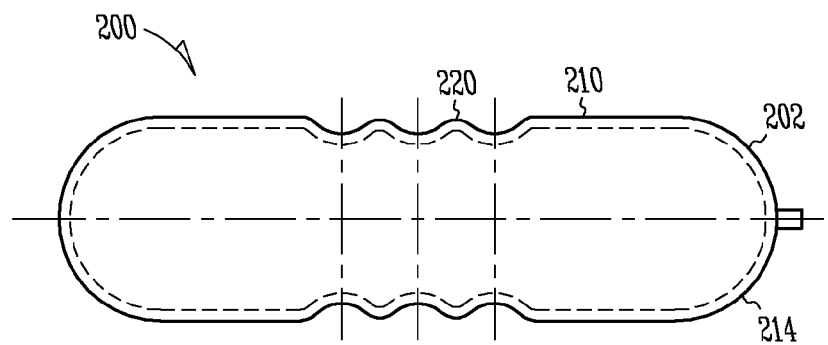
FIG. 4 shows a side view of the energy storage member of FIG. 3.

FIG. 3 shows a perspective view of energy storage member 200 according to one embodiment. FIG. 4 shows a side view of the energy storage member 200.

In this example, energy storage member is a hollow rubber bladder or pillow member 202 having an internal air pressure of about 5 psi. In other examples, the internal air pressure can be anywhere from about 2 psi to about 10 psi or more. Energy storage member 200 includes an elongate pill-shaped body 210 that is compressible. Member 200 is configured to compress when the faucet is closed and to expand when a pressure in the permeate line reaches a predetermined level.

In this example, member 200 includes an outer thermoplastic elastomer shell 215 having a thickness of about 0.04 inches. The member has a length of about 3.5 inches and a width of about an inch. Ribs 220 can be provided in the member to help it compress and expand.

Referring again to FIGS. 1 and 2, when faucet 116 is opened the corresponding drop in pressure in line 120 causes shut-off valve 106 to open feed water line 102. The feed water enters elements 108, 112 and concentrate flows out of concentrate outlet 114 while permeate is delivered to the user via faucet 116.

When faucet 116 is closed (FIG. 2), pressure increases in line 120 and member 200 is compressed. Shut-off valve 106 begins to close and pressure drops in line 120 (and branch line 124) until energy storage member 200 expands. This causes an extra volume and pressure in the permeate line which is enough to cause valve 106 to fully shut. Check valve 130 acts to maintain the pressure built up in line 120 so as to keep the feed line shut off as long as faucet 116 remains closed.

Figure 5:
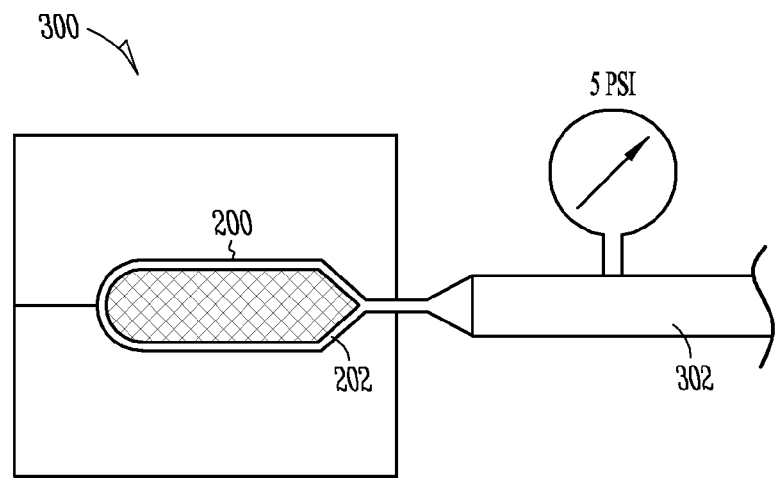
FIG. 5 shows a tool for forming the energy storage member of FIG. 3, in accordance with one embodiment.

FIG. 5 shows a tool 300 for forming the energy storage member 200, in accordance with one embodiment. To form energy member 200, a working part 202 of about 5 to 6 inches long is formed and partially cured. Part 202 is placed into sealing tool 300, an air nozzle 302 is inserted and the tool 300 is closed leaving just enough space to pressurize the part 202. The tool 300 is then closed, sealing the air pressure inside and the rubber is cured. The end of part 202 is cut, leaving member 200.

Figure 6:
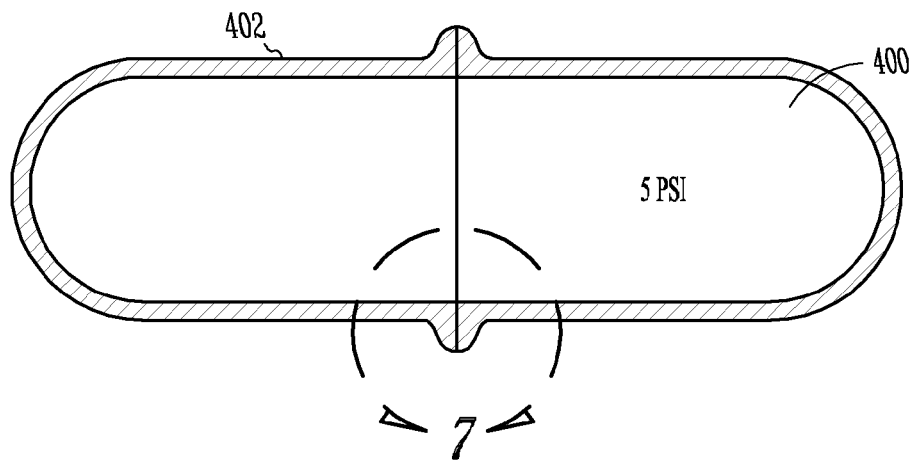
FIG. 6 shows an energy storage member according to one embodiment.

FIG. 6 shows an energy storage member 400, according to one embodiment. Energy storage member 400 can be used in place of energy storage member 200, discussed above. In this example, energy storage member includes a pill shaped body 402 formed of an elastomer. The body can be about 3.5 inches long and about 1 inch in width.

Figure 7A:
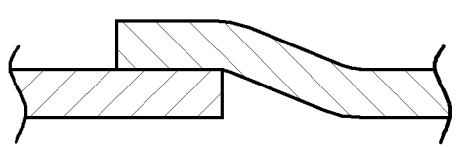
FIGS. 7A, 7B, 7C, and 7D show examples of different seams for the energy storage member of FIG. 6.
Figure 7C:
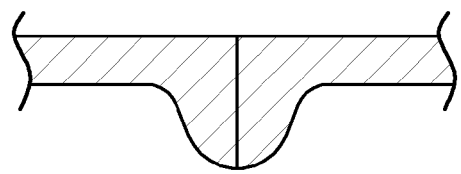
Figure 7B:
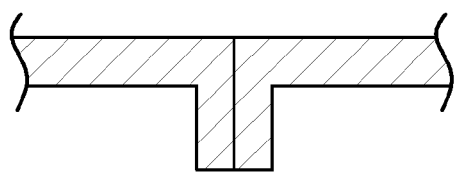
Figure 7D:
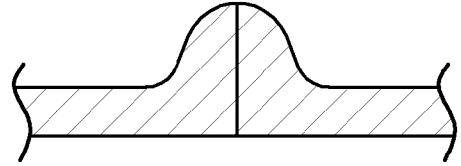

FIGS. 7A, 7B, 7C, and 7D show examples of different seams for energy storage member 400. For example, FIG. 7A shows an overlapping seam, FIG. 7B shows an side abutting seam, FIG. 7C shows a outward extending abutting seam, and FIG. 7D shows an inward extending abutting seam.

Figure 8:
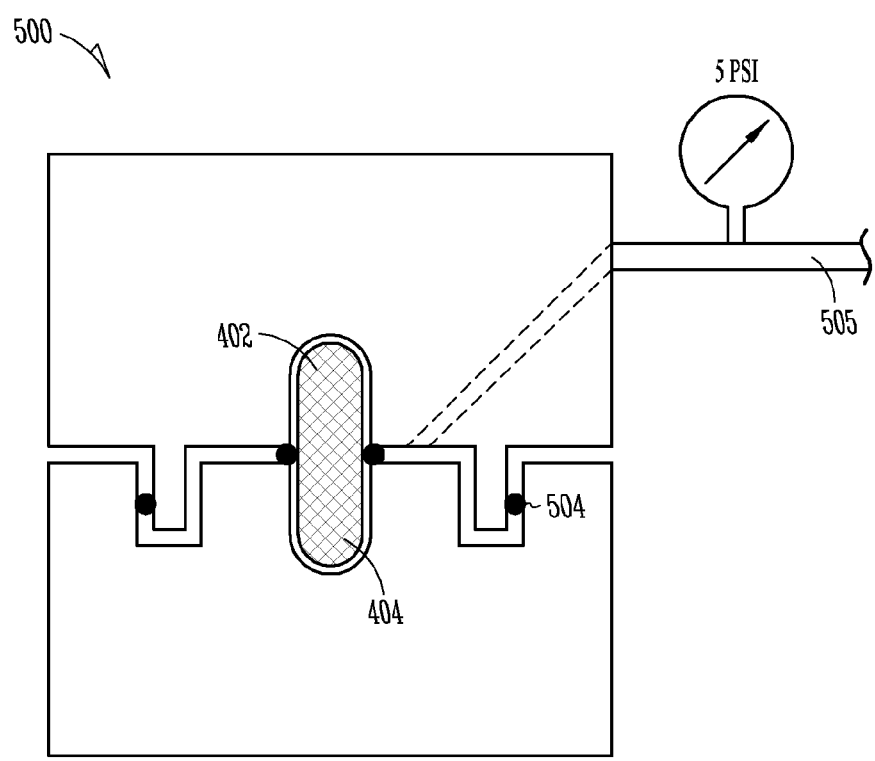
FIG. 8 shows a tool for forming the energy storage member of FIG. 6, in accordance with one embodiment.

FIG. 8 shows a tool 500 for forming the energy storage member 400. In this example, a pair of 1.75 inch long test tube shaped members 402 and 404 are formed and partially cured. The members 402 and 404 are placed into tool 500, the tool is closed to seal the cavity, leaving open enough to pressurize the cavity via air nozzle 505. The tool can include a seal 504 to seal the air in. Then the tool is closed and the rubber is cured.

In other embodiments, other energy storage members can be used for the system discussed above. For example, a diaphragm can be incorporated into permeate line 120 with either an air cushion or a spring behind it. Alternatively, an energy storage member 200 can be formed of a compressible closed-cell foam. Such examples would work as discussed above for energy member 200.

In some embodiments, a container 122 (FIG. 1) can be separately coupled to the permeate line of a filtration system. In other words, the container 122 can be an after-market item. The container 122 would contain an energy storage member 200 which is configured to compress and then expand the after faucet of the filtration system is closed.

It is understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A system comprising:
   a filtration assembly having a feed water line, a concentrate line, and a permeate line;
   a shut-off valve coupled between the permeate line and the feed water line, the shut-off valve opening the feed water line when a faucet that is connected to the permeate line is opened and closing the feed water line when the faucet that is connected to the permeate line is closed; and
   an energy storage member positioned within a container located within the permeate line, said container including a permeate inlet and a permeate outlet, said member enclosing a space not fluidly communicating with the permeate line, the energy storage member configured to compress when the faucet is closed and expands when pressure within the permeate line drops below a certain level causing the shut-off valve to fully close.

2. The system of claim 1, wherein the energy storage member includes a compressible member.

3. The system of claim 1, wherein the energy storage member includes an air-filled elastomeric member.

4. The system of claim 1, wherein the energy storage member includes an air-filled hollow compressible member which is located in the permeate line and has an internal pressure of between about 2 psi and about 10 psi.

5. A system comprising:
   a water filtration assembly including a feed water line, a concentrate line, and a permeate line;
   a shut-off valve between the permeate line and the feed water line, wherein the shut-off valve opens when a pressure differential level between the permeate line and the feed water line is less than a first level and closes when the pressure differential level between the permeate line and the feed water line is greater than a second level which is higher than the first level; and
   a compressible member positioned within a container located in the permeate line, said container including a permeate inlet and a permeate outlet, said member enclosing a space not fluidly communicating with the permeate line, the compressible member configured to expand to increase the pressure differential between the permeate line and the feed water line above the second level causing the shut-off valve to fully close.

6. The system of claim 5, wherein the compressible member contracts after a faucet that is coupled to the permeate line is closed.

7. The system of claim 5, further comprising a check valve within the permeate line that maintains pressure within the permeate line above the second level as long as a faucet that is coupled to the permeate line remains closed.

8. The system of claim 5, wherein the compressible member includes an air-filled elastomeric member.

9. The system of claim 5, wherein the compressible member contracts before the compressible member expands.

10. A system comprising: a water filtration assembly including a feed water line, a concentrate line, and a permeate line;

a shut-off valve between the permeate line and the feed water line, wherein the shut-off valve opens when a pressure differential level between the permeate line and the feed water line is less than a first level and closes when the pressure differential level between the permeate line and the feed water line is greater than a second level which is higher than the first level; and a member positioned within a container located in the permeate line, said container including a permeate inlet and a permeate outlet, said member enclosing a space not fluidly communicating with the permeate line, the member configured to compress and then to expand increasing the pressure differential between the permeate line and the feed water line above the second level causing the shut-off valve to fully close.

11. The system of claim 10, wherein the member includes an air-filled elastomeric member.

* * * * *

UNITED STATES PATENT AND TRADEMARK OFFICE
CERTIFICATE OF CORRECTION

PATENT NO. : 7,655,139 B2  Page 1 of 1
APPLICATION NO. : 11/212476
DATED : February 2, 2010
INVENTOR(S) : Sieth et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1146 days.

Signed and Sealed this

Twenty-eighth Day of December, 2010

David J. Kappos
*Director of the United States Patent and Trademark Office*